(12) United States Patent
Engel

(10) Patent No.: US 6,696,775 B2
(45) Date of Patent: Feb. 24, 2004

(54) APPARATUS FOR COMMUTATION OF A HELICAL COIL LAUNCHER

(75) Inventor: Thomas Engel, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 10/054,566

(22) Filed: Jan. 22, 2002

(65) Prior Publication Data
US 2003/0137377 A1 Jul. 24, 2003

(51) Int. Cl.$^7$ .................. H02K 41/00; H02K 49/00; F41F 7/00
(52) U.S. Cl. ............... 310/135; 310/12; 310/13; 310/14; 310/15; 89/8; 124/3
(58) Field of Search .................. 310/12, 13, 14, 310/15; 124/3; 89/8

(56) References Cited

U.S. PATENT DOCUMENTS

| | | | | | |
|---|---|---|---|---|---|
| 3,857,050 A | * | 12/1974 | Harris | ........................ | 310/13 |
| 4,074,153 A | * | 2/1978 | Baker | ........................ | 310/12 |
| 4,698,532 A | * | 10/1987 | Ross | ........................ | 310/12 |
| 4,841,181 A | * | 6/1989 | Kemeny | ........................ | 310/12 |
| 5,017,549 A | * | 5/1991 | Robertson | ........................ | 124/3 |
| 5,294,850 A | * | 3/1994 | Web | ........................ | 310/13 |
| 5,483,863 A | * | 1/1996 | Dreizin | ........................ | 89/8 |

OTHER PUBLICATIONS

Karlheinz Thom and Joseph Norwood, Jr., NASA TN D–886, "Theory of an Electromagnetic Mass Accelerator For Achieving Hypervelocities", National Aeronautics and Space Administration, Washington, Jun. 1961.

Peter Mongeau, "Analysis of Helical Brush Commutation", IEEE Transactions on Magnetics, vol. MAG–20, No. 2, Mar. 1984, pp. 231–234.

Henry Kolm and Peter Mongeau, "Basic Principles of Coaxial Launch Technology", IEEE Transactions on Magnetics, vol. MAG–20, No. 2, Mar. 1984, pp. 227–230.

Peter Mongeau and Fred Williams, "Helical Rail Glider Launcher", IEEE Transactions on Magnetics, vol. MAG–18, No. 1, Jan. 1981, pp. 190–193.

* cited by examiner

Primary Examiner—Nestor Ramirez
Assistant Examiner—Iraj A Mohandesi
(74) Attorney, Agent, or Firm—Greer, Burns & Crain, Ltd.

(57) ABSTRACT

Apparatus for commutating turns of a stator coil for a helical coil launcher. An annular brush assembly includes an annular support and a plurality of electrical contacts disposed circumferentially about the annular support for contacting the stator coil. A projectile for a helical coil launcher is also disclosed having an armature coil and a body assembly containing at least one annular brush assembly for contacting a stator coil that is slidably engaged with the projectile.

23 Claims, 4 Drawing Sheets

APPARATUS FOR COMMUTATION OF A HELICAL COIL LAUNCHER

STATEMENT OF GOVERNMENT INTEREST

This invention was made with Government assistance under Grant No. N00173-98-D-2015 from the Naval Research Laboratory. The Government has certain rights in the invention.

FIELD OF THE INVENTION

The present invention relates generally to devices for producing linear movement.

BACKGROUND OF THE INVENTION

Helical coil electromagnetic launchers, also known as coil guns, are efficient devices for generating linear forces that can be used to accelerate macroscopic particles to a high velocity, or convey particles for various uses, such as aerospace, automotive, farming, earth-moving equipment, conveyance devices such as elevators or conveyors, or any industry or type of device where linear motion is needed or desired. Linear accelerators such as helical coil launchers can be used to move particles quickly and with a significant amount of force. The efficiency of the helical coil launcher increases as the scale of the launcher increases, making the launcher a particularly useful device in principle for linear acceleration of relatively large objects.

One reason that the helical coil launcher is such an effective linear force generator is that it has a large inductance gradient between an armature coil/projectile and a stator coil, which can be two or more orders of magnitude greater than that of a conventional rail launcher. Therefore, in comparison to the rail launcher, the helical coil launcher can generate the same accelerating force at much lower currents.

However, to optimize the potential of the helical coil launcher in practice, the turns of the stator coil must be efficiently commutated.

SUMMARY OF THE INVENTION

The present invention provides an apparatus for efficient commutation of stator coil turns for a helical coil electromagnetic launcher. An annular brush assembly is disclosed having an annular support and a plurality of electrical contacts, such as brushes, disposed circumferentially about the annular support for contacting the stator coil. The electrical contacts are connected to one another in parallel.

The annular brush assembly of the present invention allows multiple, simultaneous contacts about the stator coil, so that transition between turns of the stator coil is effectively negated as the annular brush assembly, connected to an armature coil, moves axially along the stator coil. With an absence of transition effects between stator coil turns, the commutation energy is correspondingly minimized. There is accordingly less resistance to linear movement of the armature coil between turns, and significantly less arcing, which results in less wear on the electrical contacts and more efficient operation of the helical coil launcher.

The plurality of contacts may be disposed about the annular support substantially symmetrically. The contacts may extend radially outwardly from the annular support radially inwardly, or through the annular support. The annular support may be a separate piece, or may be an integrated portion of a body assembly connected to the armature coil, and may include a number of apertures for holding the plurality of contacts. A biasing means may be provided for biasing the contacts towards the stator coil.

The present invention also provides a projectile for a helical coil launcher including an armature coil, a body assembly connected to the armature coil, and an annular brush assembly, the annular brush assembly including a plurality of electrical contacts, such as brushes, extending circumferentially about the annular brush assembly for contacting a first end of a portion of the stator coil slidingly engaged with the projectile. The plurality of electrical contacts are connected to one another in parallel.

Preferably, the projectile includes a rail brush for contacting a conductive rail, the rail brush being electrically coupled to the electrical contacts of the annular brush assembly, preferably via an end contact. Most preferably, the projectile further includes a second annular brush assembly, the second annular brush assembly being configured for contacting a second end of the portion of the stator coil.

DETAILED DESCRIPTION OF THE INVENTION

The present invention provides among other things an apparatus for efficient commutation of turns for a helical coil launcher. The apparatus includes an annular brush assembly, having an annular support and a plurality of electrical contacts disposed circumferentially about the annular support for contacting turns of a stator coil. In this way the annular brush assembly, electrically coupled with an electrically conductive rail or an armature coil, makes nearly complete electrical contact about the circumference of the stator coil. As a result, axial movement of the armature coil and connected annular brush assembly relative to the stator coil results in smooth, continuous transition between turns of the stator coil and substantially reduced commutation power and power density. The annular brush assembly of the present invention may be integrated into a variety of types of embodiments of helical coil launchers. An exemplary type of helical coil launcher is disclosed below having one preferred type of embodiment of the annular brush assembly.

Figure 1:
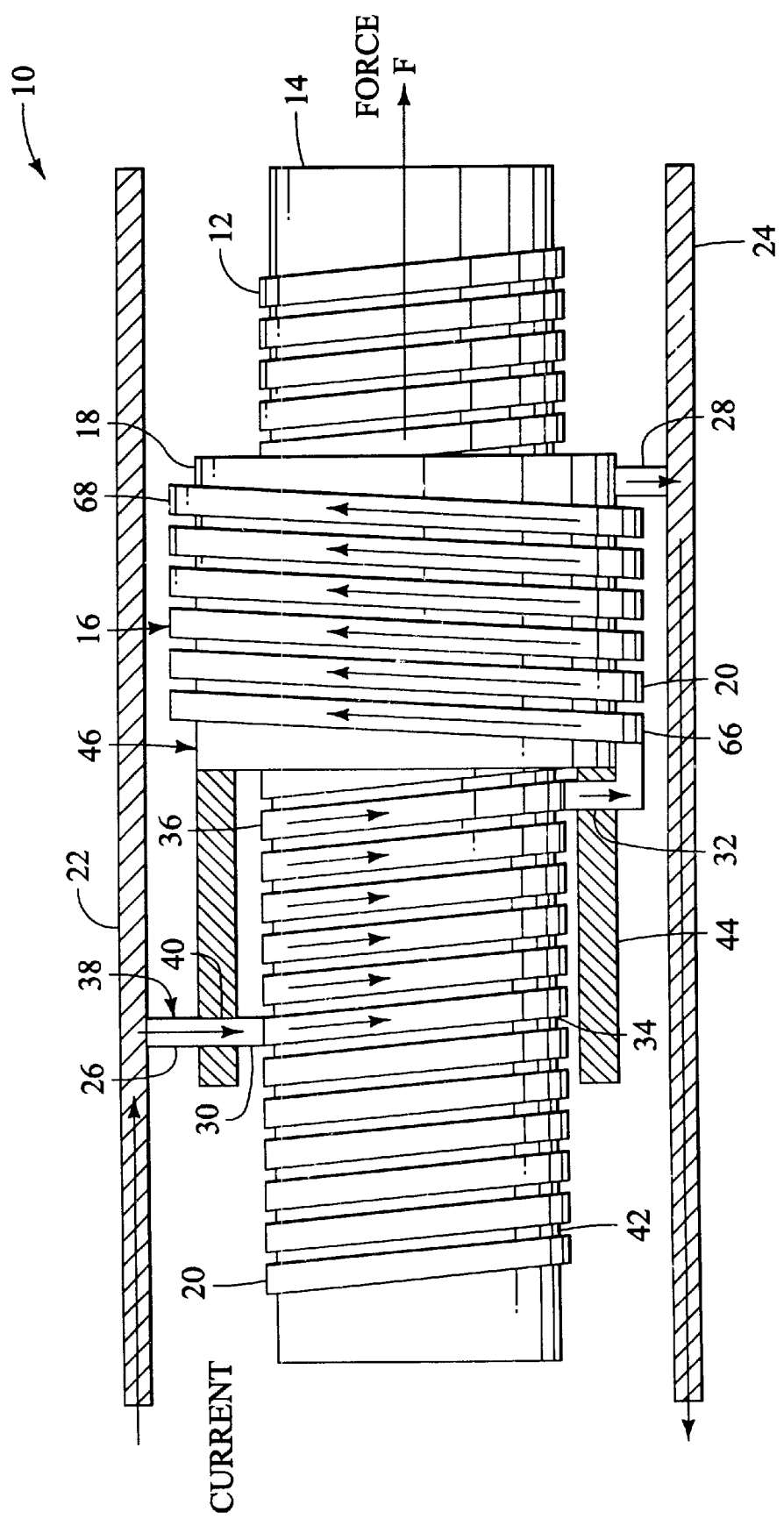
FIG. 1 is a schematic side view of a conventional two-rail helical coil launcher.

An example of a conventional type of helical coil launcher 10 is shown in FIG. 1. The helical coil launcher is, basically, a linear electric motor. The helical coil launcher 10 includes a stator coil 12 wound about a core 14 or other support structure, and an armature coil 16. The armature coil 16 may be radially disposed about the stator coil 12, or vice versa, and is also wound about a core 18 or other support structure. In the embodiment shown in FIG. 1, the stationary stator coil 12 has a significantly greater axial length than the armature coil 16 and a smaller cross-section, so that the armature coil is free to move along the length of the stator coil.

Both coils 12, 16 have a number of turns 20 wound in the appropriate directions so as to create an attractive or repelling magnetic field when current is applied to the coil pair. The resulting opposing axial forces push the armature coil 16 and stator coil 12 in mutually opposite axial directions, either repelling one another or attracting one another. The stator coil 12 is fixed to remain stationary, so that a resulting accelerating force F moves the armature coil 16 axially along the length of the stator coil, producing linear motion in the helical coil launcher 10. The armature coil 16 accordingly becomes a projectile subjected to linear acceleration forces.

Compared to other linear launchers, such as conventional rail launchers, the helical coil launcher 10 has a mutual inductance spatial gradient between the stator coil 12 and the armature coil 16 that can be two or more orders of magnitude greater. The large inductance gradient of the helical coil launcher 10 allows for a greater linear acceleration with a reduced power requirement. Therefore, as opposed to other linear launchers, the helical coil launcher 10 can generate an equal or greater accelerating force at a lower current.

In two-rail helical coil launchers, such as the helical coil launcher 10 shown in FIG. 1, a first conductive rail 22 and a second, parallel conductive rail 24 carry current to the stator coil 12 and from the armature coil 16 to complete a circuit. The second conductive rail 24 is not required for all embodiments of the helical coil launcher 10. Instead, the helical coil launcher 10 may include only a single rail 22, with existing components used or additional components being added to complete the circuit. Such single-rail launchers are known by those in the art.

Electrically connected brushes, or sliding contacts, electrically contact and couple the first rail 22 to the turns 20 of the stator coil 12 and the turns 20 of the armature coil 16 to the second rail 24 (if included). First and second rail brushes 26, 28 electrically contact the first and second rails 22, 24, respectively, and first and second stator brushes 30, 32 contact the turns 20 of the stator coil 12 at first and second ends 34, 36, respectively, of a portion of the stator coil. A single, two-contact brush 38 can be used to replace the combination of a stator brush and a rail brush in certain designs. For example, in the illustrative embodiment shown in FIG. 1, first and second ends of the two-contact brush 38 perform the function of the first rail brush 26 and the first stator brush 30, respectively. The brushes 26, 28, 30, 32 in the conventional helical coil launcher 10 are preferably made of copper, as copper is a good conductor that is more resistant to the erosion of the brushes that results during acceleration of the armature coil 16, the erosion being further explained below.

A substantially annular support 40 supports one or more of the first and second rail brushes 26, 28 and the first and second stator brushes 30, 32, and helps the brushes to maintain contact with the rails 22, 24 and/or the stator coil 12. The support 40 is typically integrated into are attached to the armature coil 16 or a body attached to the armature coil, though the support may instead be a separate piece. The rail brush 26, 28 or the stator brush 30, 32 projects radially inwardly or radially outwardly from the support 40 for contact, depending on the relative position of the portion to be contacted. For example, in certain embodiments of the helical coil launcher 10, the stator coil 12 may be hollow and radially disposed about the armature coil 16. In these embodiments, for example, the first stator brush 30 may project radially outwardly from the support 40. The first stator brush 30 of FIG. 1 projects radially inwardly to contact an outer portion of the stator coil 12.

The first and second stator brushes 30, 32 typically each have a minimum thickness in the axial direction equal to thickness (in the axial direction) of insulation 42 between the turns 20 of the stator coil 12, so that at least one turn is always contacted by each brush. However, the first and second stator brushes 30, 32 typically have a maximum thickness in the axial direction of approximately the thickness of the wire forming the turns 20 of the stator coil 12 (plus or minus a portion of the thickness of the insulation 42), to maximize the number of turns of the stator coil generating a magnetic field. The circumferential length of the stator brushes 30 32 is usually no larger than its thickness; i.e., approximately the thickness of the wire forming the turns 20 of the stator coil 12.

To generate the maximum amount of linear (axial) force, the mutual inductance gradient between the armature coil 16 and the stator coil 12 must be maintained at or near its maximum value. To maintain the mutual inductance spatial gradient at or near its peak value, the first and second rail brushes 26, 28 and stator brushes 30, 32 are physically connected to the armature coil 16 so that they move with the armature coil in an axial direction. In the embodiment shown in FIG. 1, for example, the first and second stator brushes 30, 32 are connected to annular supports 40 that are integrated into a body assembly 44, which may also support the first and second rail brushes 26, 28. The armature coil 16 and the body assembly 44, accordingly, together form a projectile 46 for the helical coil launcher 10. Use of the brushes 26, 28, 30, 32 attached to and moving with the armature coil 16 to optimize the mutual inductance gradient is disclosed in, e.g., National Aeronautics and Space Administration Technical Note D-886, "Theory of An Electromagnetic Mass Accelerator for Achieving Hypervelocities," June 1961, the entire contents of which are incorporated herein by reference.

In operation of the conventional helical coil launcher 10 shown by example in FIG. 1, a current, which may be DC or AC, steady or pulsed, such as a pulse forming network or PFN current, flows through the first rail 22 and the contacting first rail brush 26, to the first stator brush 30 contacting the stator coil 12. The first end turn 34 (or adjacent pair of turns) of the stator coil 12 picks up the current from the first stator brush 30, where it flows through a number of the turns 20 to the second end turn 36 (or adjacent pair of turns) in contact with the second stator brush 32. Through the second stator brush 32, the current flows through each of the turns 20 of the armature coil 16 to the second rail brush 28. Through the second rail brush 28, the current flows to the second rail 24.

In the stator coil 12, the current flows through each of the turns 20 between the first stator brush 30 and the second stator brush 32 to induce a magnetic field continuously from the turn 34 contacting the first brush up to the turn 36 contacting the second brush. A high mutual inductance gradient results because the armature coil 16 and stator coil 12 stay magnetically close together.

As the armature coil 16 moves axially along the length of the stator coil 12, the accompanying first and second stator brushes 30, 32 contact and disconnect from one turn 20 of the stator coil 12 to the next in lengthwise succession. As can be seen in FIG. 1, axial movement by the armature coil 16 so that the first stator brush 30 passes from a location on one turn 20 to the same location on an adjacent turn (a distance substantially equal to the thickness of the turn plus the thickness of the insulation 42 between the turns) energizes ("adds") one stator coil turn in the direction of the motion of the armature coil and de-energizes ("removes") one stator coil turn in the direction opposite to the motion. The addition and removal of energized turns 20 is known as commutation. The addition and removal of stator coil turns 20 can equivalently be represented with simple LR circuits that are magnetically coupled to the other parts of the circuit. The difference between the two equivalent circuits is primarily in their initial conditions. The stator coil turn 20 that is added has an equivalent circuit with zero initial current while the stator coil turn 20 that is removed has an equivalent circuit with non-zero initial current.

As explained above, the conventional helical coil launcher 10 is designed to maintain a maximal mutual inductance gradient. However, to realize the full potential of the helical coil launcher 10 in practice, the turns 20 of its stator coil 12 must be efficiently commutated.

The first and second stator brushes 30, 32 each form single contacts with the turns 20 of the stator coil 12. In conventional helical coil launchers 10, the commutation process is performed in a discontinuous fashion between the turns 20, resulting in interruption of current flow when connecting or disconnecting from each turn 20 of the stator coil 12. The removal of the turn 20 of the stator coil 12 is accomplished the moment the stator brush 30 slides off the turn and is no longer in physical contact with it. The addition of the turn 20 of the stator coil 12 is accomplished the moment the brush 32 slides onto the turn making electrical contact with it. Also, the single contacts of the first and second stator brushes 30, 32 each have a relatively small surface area.

The discontinuous addition and removal of stator coil turns 20 generates large commutation voltages and energies that must be absorbed by the stator brushes 30, 32. The commutation energy is the energy remaining in the stator coil turn 20 that is removed plus the energy produced in any arc formation process. The stator coil inductance resists the interruption of current resulting from the removal or introduction of the individual stator coil turns 20. In FIG. 1, removal of the stator coil turns 20 results from axial movement of the first stator brush 30, and addition of stator coil turns results from axial movement of the second stator brush 32. The commutation voltage produces arcs that form between removed or additional turns 20 and the brushes 30, 32 previously in contact with or disconnected from them. The commutation process results in inefficient operation of the helical coil launcher 10 (as large commutation voltages produce large loss terms and as the stator coil 12 is magnetically decoupled from the armature coil 16). Energy dissipation from the arc generates a significant amount of heat that leads to premature deterioration of the brushes 30, 32, which eventually results in electrical disconnection and thus deceleration of the armature coil 16. The aforementioned problems with commutation energy and its effect on the brushes 30, 32 have significantly hindered development of many practical applications for helical coil launchers.

The present invention addresses these and other problems by providing an apparatus for commutating turns of a stator coil, whether in the type of helical coil launcher as shown in FIG. 1 or in other types of helical coil launchers. The apparatus includes a substantially annular brush assembly 50, shown by example in FIG. 2, having a substantially annular support 52 and a plurality of electrical contacts or brushes, herein termed "brush segments" 54, which are disposed circumferentially about the annular support. The brush segments 54 are electrically coupled to one another in parallel and may be electrically coupled to an end contact 56, which itself is configured for electrical contact with another component of the helical coil launcher 10. The brush segments 54 may extend through portions of the annular support 52, and/or may extend radially inwardly or outwardly from the annular support to contact the stator coil 12, depending on the relative locations of the armature coil 16 and the stator coil as will be appreciated by those in the art.

Figure 2:
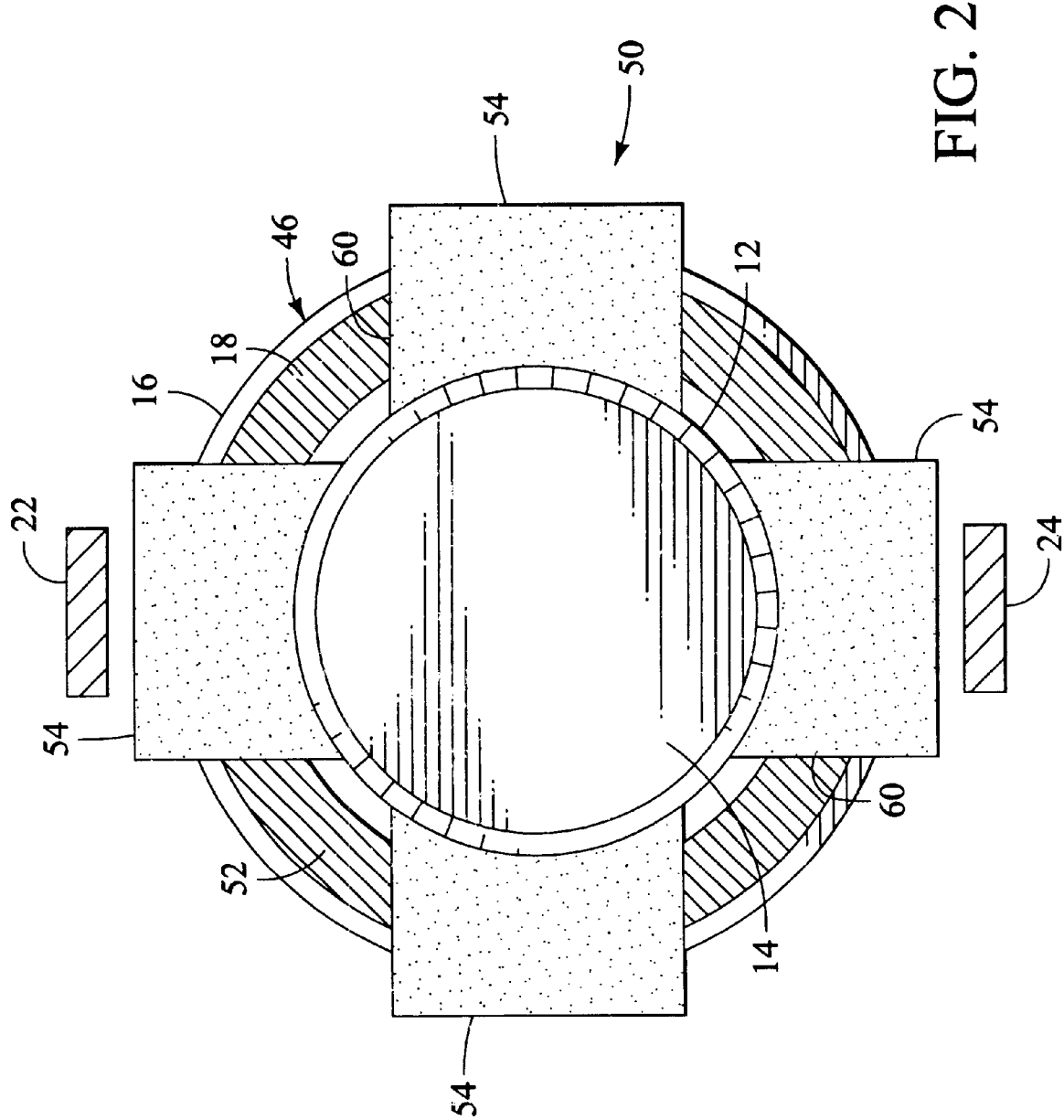
FIG. 2 is an end view of a projectile having an annular brush assembly according to a preferred type of embodiment of the present invention.

In the exemplary annular brush assembly 50 shown in FIG. 2, a plurality of brush segments 54 (in FIG. 2, four brush segments) are disposed circumferentially about the annular support 52. The brush segments 54 may be of substantially equal circumferential length, but need not be. The brush segments 54 are connected to one another in parallel via connectors 58 between each brush segment. The particular connectors 58 used in the annular brush assembly 50 may vary; for example, standard wire may be used. The annular brush assembly 50 must include at least two electrically connected brush segments 54, but otherwise the number may vary. For example, the number of brush segments 54 preferably increases if the annular brush assembly 50 is of a larger diameter. The brush segments 54 may be made of copper, as in conventional brushes, but preferably may be made of copper-graphite, graphite, copper-tungsten, or other materials or alloys. A greater variety of materials for the brush segments 54 is possible with the inventive annular brush assembly 50 due to the reduction of adverse effects from commutation energy.

The annular support 52 may be made of various materials, but preferably is formed of material that is electrically insulative, of high strength, and relatively light, as the annular support is preferably an integral component of, and is connected to, the armature coil 16 or the body assembly 44, which together form the projectile 46. The term "annular support" is not intended to require a separate piece, a completely closed piece, or a completely circular cross-sectional shape, but instead only refers to a support from which the brush segments 54 extend circumferentially about or within the stator coil 12. Preferably, the annular support 52 is integrated into the body assembly or is part of an integrated projectile 46 that includes the armature coil 16, though the annular support may be a separate piece. In other words, a portion of the body assembly 44 from which the brush segments extend can be considered the annular support 52. In a preferred embodiment, the annular support 52 is made of an insulative material such as G-10 (fiberglass reinforced epoxy). As shown in the example of FIG. 2, the annular support 52 is part of the projectile 46, and contains a number of machined slots 60 about its circumference, in which the brush segments 54 are fitted. The brush segments 54 can extend through the slots 60, as shown, or may fit at least partially within the slots at one end to extend radially outwardly or radially inwardly. The number of the slots 60 varies depending on the number of the brush segments 54 used, but the overall surface area of the slots, and thus the number of slots and the brush segments, should not be so large as to undesirably undermine the structural strength of the annular support 52 or the body assembly 44 into which the support may be integrated.

The end contact 56 is connected via a connecting wire 62 from any of the brush segments 54 or the connectors 58 electrically coupling them. The connecting wire 62 preferably extends from the annular brush assembly 50 for connection to another component. For example, the end contact 56 may be electrically coupled to the first rail brush 26 or the armature coil 16.

The annular brush assembly 50 contacts the stator coil 12 similarly to the stator brushes 30, 32 of the conventional helical coil launcher 10, but instead of a single contact point, the annular brush assembly contacts the stator coil at multiple contact points about the circumference of the stator coil. For example, in the helical coil launcher 10 shown in FIG. 1, the annular brush assembly 50 may replace one or both of the first and second stator brushes 30, 32 (and their respective annular supports 40) in the body assembly 44 connected to or integrates with the armature coil 16.

Figure 3:
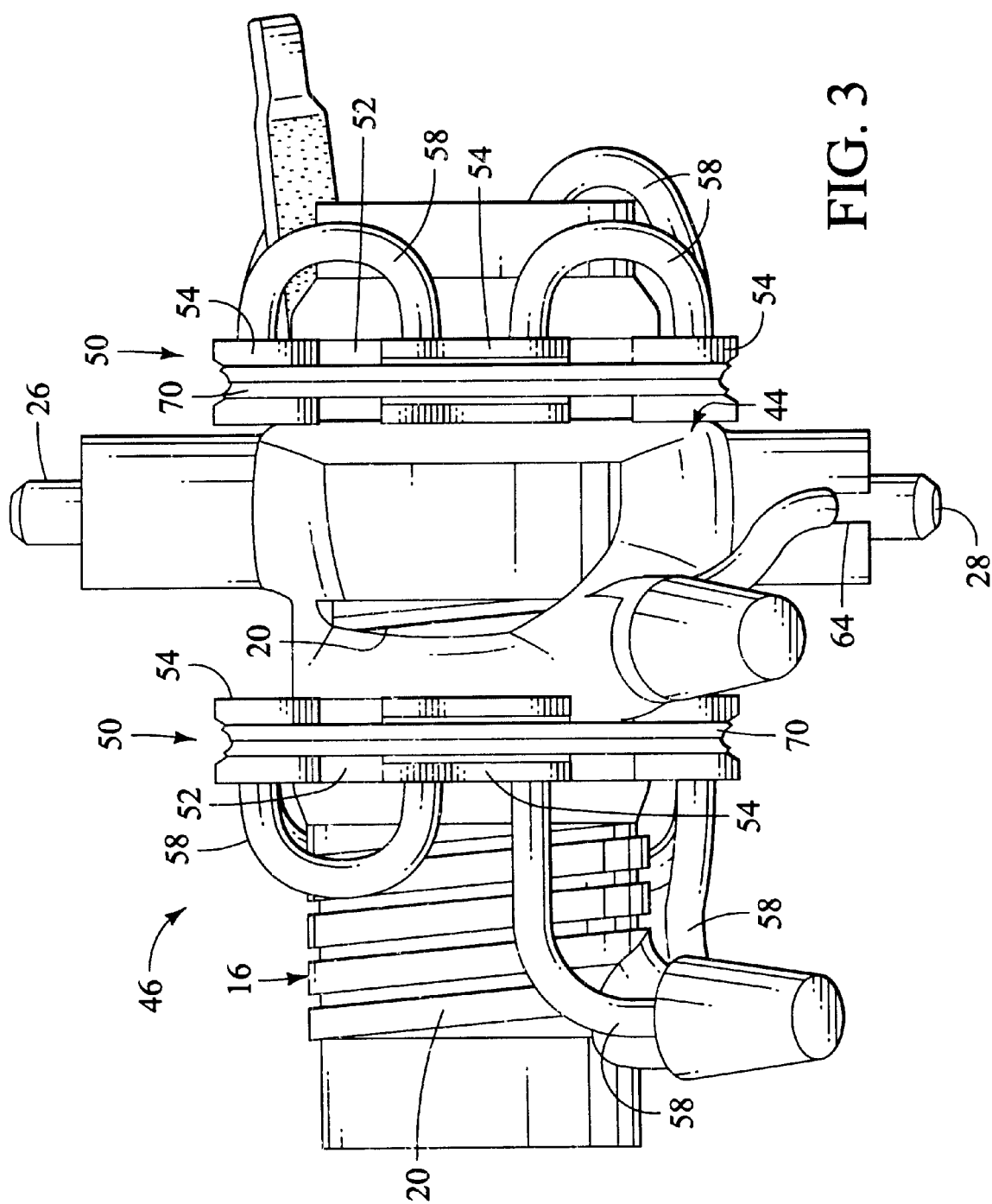
FIG. 3 is a top perspective view of an armature coil and body with a pair of annular brush assemblies according to a preferred type of embodiment of the present invention.
Figure 4:
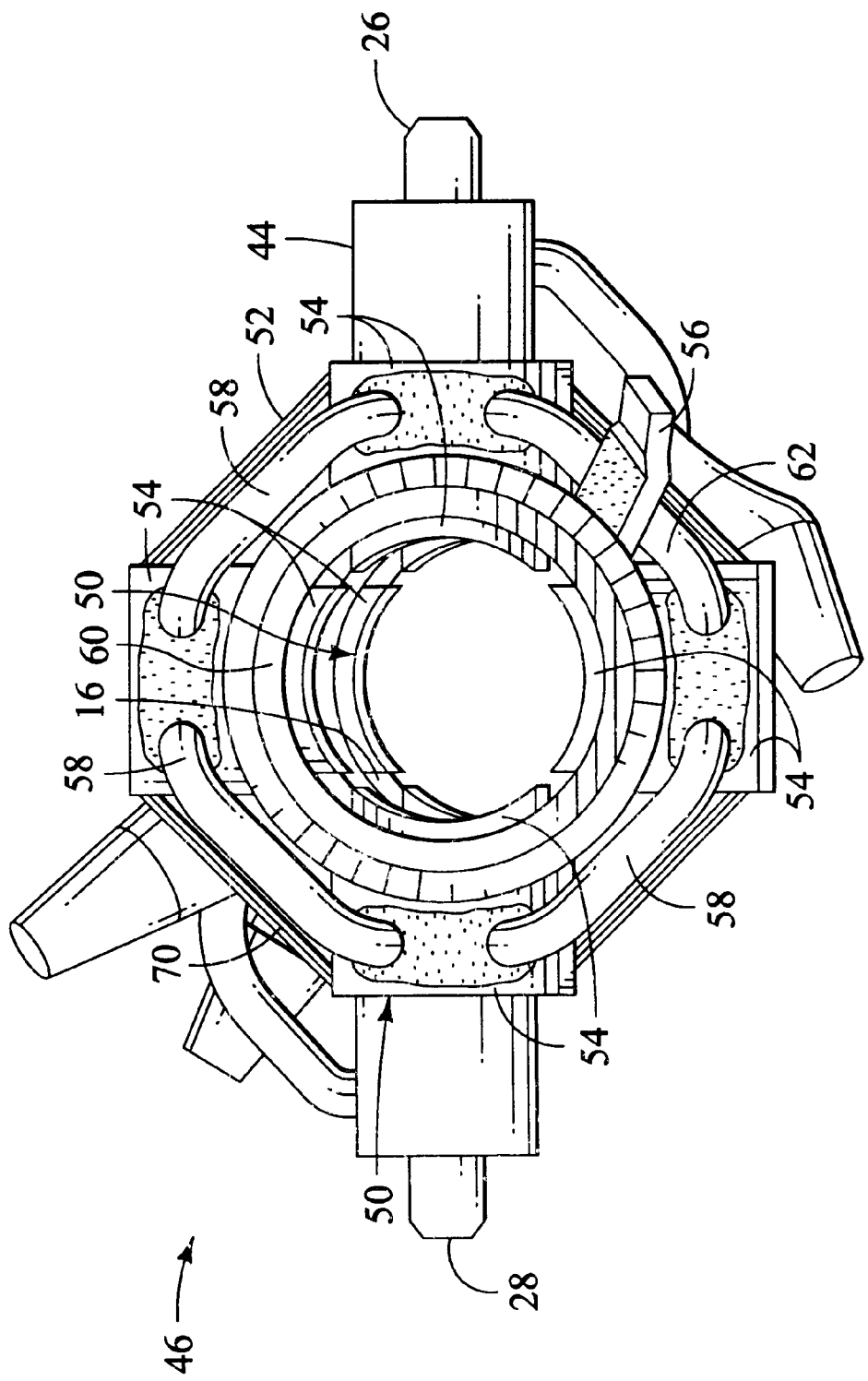
FIG. 4 is an end perspective view of the armature coil and body shown in FIG. 3.

FIGS. 3 and 4 show side and end views, respectively, of an armature coil 16 and body assembly 44 (together, the projectile 46 of the helical coil launcher 16) having a pair of annular brush assemblies 50 similar to that shown in FIG. 2. The body assembly 44, connected to the armature coil 16 via epoxy glue, includes a hollow casing of G-10 having apertures 64 at opposing lateral ends for supporting the first and second rail brushes 26, 28, which are configured to contact laterally opposing first and second conductive rails 22, 24 (not shown in FIGS. 3 and 4). Preferably, the first and second rail brushes 26, 28 are slidingly engaged with facing grooves (not shown) within the first and second conductive rails 22, 24, respectively, to minimize rotation of the armature coil 16 as it moves axially along the stator coil 12, which is slidingly engaged with the complete projectile 46. The first rail brush 26 is electrically coupled to the end contact 56 of the annular brush assembly 50 that replaces the first stator brush 30. The armature coil 16 at a first end turn 66 is electrically coupled to the end contact of the annular brush assembly that replaces the second stator brush 32 and the second rail brush 28 is electrically coupled to the axially opposing end turn 68 of the armature coil. The annular brush assemblies 50 replacing the first and second stator brushes 30, 32 are axially disposed within the body assembly 44 so that their respective brush segments 54 contact the first end turn 34 and the second end turn 36 of the stator coil 12, respectively, as shown by example in FIG. 1.

As shown in FIG. 4, the four brush segments 54 of both annular brush assemblies 50 are disposed circumferentially about and extend through the annular supports 52 that are integral parts of the body assembly 44 (by machining slots 60 into the body assembly), for contacting the stator coil 12 (not shown in FIGS. 3 and 4) slidingly engaged with the overall projectile 46 and extending axially through the armature coil 16 (and the hollow body assembly 44). For maintaining contact between the radial interior of the brush segments 54 and the exterior of the stator coil 12, a biasing device 70, such as an elastic band disposed about the annular brush assembly 50, biases the brush segments against the stator coil 12; in FIGS. 3 and 4, radially inwardly. The biasing device 70 may also be used to hold the brush segments 54 within the slots 60 of the annular support 52.

Prior art helical coil launchers 10 use stator brushes 30, 32 with a single point of contact. Compared to the inventive annular brush assembly 50, the single-contact stator brushes 30, 32 produce a commutation process that is discontinuous (i.e., occurring in steps, one coil turn 20 at a time). In addition, the single-contact stator brushes 30, 32 creates a higher commutation power that it must absorb over a small area of contact. Most common conductors are unacceptable for use as single-contact stator brushes 30, 32 since they are unable to absorb the large commutation power without melting.

Hypothetically, a single contact that revolves while moving axially along the stator coil 12 would trace the turns 20 of the coil, in completely continuous fashion. As there would be no interruption in current, the commutation process would be continuous and the commutation energy would be reduced to zero. With the annular brush assembly 50, the addition and removal of turns 20 of the stator coil 12 are done in a substantially continuous fashion while moving only axially along the stator coil. With the annular brush assemblies shown in FIGS. 2–4, the brush segments 54 substantially surround and make almost complete contact around the periphery of the stator coil 12. The brush segments 54 form multiple, continuous points of contact that substantially "trace out" the turns 20 of the stator coil 12, as the annular brush assembly 50 traverses the axial length of the stator coil. The commutation energy is reduced to almost zero and is now distributed over a much larger brush area. Additionally, any commutation energy that remains is more continuously delivered over much longer time periods and larger surface areas, when compared to the case of the single-contact brushes 30, 32, effectively reducing the commutation power and power density. Distributing the commutation energy and power density over a longer period and greater surface area reduces the amount of localized brush heating and the chances for arc formation. Contact resistance is, therefore, kept low which ensures efficient brush and launcher operation.

It will be apparent to those in the art that a new and inventive helical coil launcher 10 having an annular brush assembly 50 has been shown and described herein. The helical coil launcher 10 having the annular brush assembly 50 of the present invention has, among other benefits versus the prior art, reduced brush arcing and heating, lower contact resistance, commutation of higher currents at higher armature velocities, a spatial distribution of commutation energy, and lower commutation power. The lower commutation power allows the manufacture of brush segments 54 (electrical contacts) from conductors with lower melting temperatures, a longer brush and launcher lifetime, and improved reliability. The annular supports 52 also can be part of the body assembly 46, for relatively simple implementation. Because of these and other benefits, the helical coil launcher 10 having the inventive annular brush assembly 50 may provide a source of constant and high starting and running torque for systems for linear movement of macroscopic objects, while greatly simplifying design of the system and improving efficiency.

It will appreciated by those in the art that the annular brush assembly 50 of the present invention may be integrated into various types of helical coil launchers beyond those disclosed in the present description. The annular brush assembly 50 may be integrated into, among other launchers, one-rail and two-rail helical coil launchers, whether the armature coil 16 is disposed radially outside of the stator coil 12, or vice versa. The annular brush assembly 50 is not limited to a particular configuration, shape, size, or material for the annular support 52, brushes 54, connecting wires 58, end contacts 56, biasing means 70, or other possible components.

While various embodiments of the present invention have been shown and described, it should be understood that other modifications, substitutions, and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An apparatus for accelerating particles in a linear direction, the apparatus comprising:
   a conductive rail;
   a rail brush slidingly coupled with an electrical contact with said conductive rail;
   a stator coil;
   a projectile slidingly coupled with said stator coil, the projectile including an armature coil and first and second stator brushes connected to said armature coil so as to move with said armature coil, said first and second stator brushes being disposed so as to contact first and second end turns of a portion of said stator coil, said first stator brushes being electrically coupled to said rail brush and said second stator brush being electrically coupled to said armature coil;

at least one of said first and second stator brush comprising an annular brush assembly, said annular brush assembly including an annular support and a plurality of electrical contacts disposed circumferentially about said annular support and contacting said stator coil, said plurality of electrical contacts being electrically coupled to one another in parallel.

2. The apparatus of claim 1 wherein said annular support is integrated into a body assembly connected to said armature coil.

3. The apparatus of claim 1 wherein said electrical contacts extend radially from said annular support to contact an outer circumference of said stator coil.

4. The apparatus of claim 1 wherein said second stator brush is electrically coupled to said armature coil at a first end, and further comprising a second rail brush electrically coupled to a second end of said armature coil and to a second conductive rail.

5. An apparatus for commutating turns of a coil of a linear accelerator, the apparatus comprising:

an annular support; and a plurality of electrical contacts disposed circumferentially about said annular support for contacting the coil, said plurality of contacts being coupled to one another in parallel.

6. The apparatus of claim 5 wherein said electrical contacts are disposed circumferentially about said annular support substantially symmetrically.

7. The apparatus of claim 5 further comprising an end contact coupled to said plurality of electrical contacts.

8. The apparatus of claim 5 wherein said plurality of electrical contacts extend radially inwardly from said annular support.

9. The apparatus of claim 5 wherein said plurality of electrical contacts extends radially outwardly from said annular support.

10. The apparatus of claim 5 wherein said plurality of electrical contacts extends through said annular support.

11. The apparatus of claim 5 wherein said plurality of electrical contacts is connected together by a plurality of connecting wires.

12. The apparatus of claim 11 further comprising an end contact coupled to at least one of said plurality of connecting wires.

13. The apparatus of claim 5 wherein said electrical contacts comprise brushes.

14. The apparatus of claim 13 wherein said electrical contacts comprise at least one of graphite, graphite alloy, and tungsten.

15. A projectile for a helical coil launcher, comprising:

an armature coil;

a body assembly connected to said armature coil;

said body assembly including an annular brush assembly for electrically contacting a stator coil, said annular brush assembly including a plurality of brush segments disposed circumferentially about said annular brush assembly, said brush segments being connected to one another in parallel.

16. The projectile of claim 15 further comprising a rail brush connected to said body assembly, said rail brush being electrically coupled to said plurality of brush segments.

17. The projectile of claim 15 wherein said plurality of brush segments extends radially inwardly from said annular brush assembly.

18. The projectile of claim 15 wherein said plurality of brush segments extends radially outwardly from said annular brush assembly.

19. The projectile of claim 15 further comprising an annular support integral with said body and having a plurality of apertures for containing said plurality of brush segments.

20. The projectile of claim 19 further comprising a biasing device for biasing said plurality of brush segments in at least one of a radially outward and a radially inward direction.

21. The projectile of claim 16 wherein said body assembly further comprises a second annular brush assembly, said first and second annular brush assemblies being configured for contacting first and second turns of said stator coil.

22. The projectile of claim 21 further comprising a second rail brush connected to said body assembly and electrically coupled to said armature coil.

23. The projectile of claim 15, wherein said plurality of brush segments is disposed substantially symmetrically about said annular brush assembly.

* * * * *